United States Patent
Crawford (10) Patent No.: US 9,850,128 B2
(45) Date of Patent: Dec. 26, 2017

(54) 3-DIMENSIONAL PATTERN TRANSFER NANOMANUFACTURING

(71) Applicant: Thomas Crawford, Irmo, SC (US)

(72) Inventor: Thomas Crawford, Irmo, SC (US)

(73) Assignee: University of South Carolina, Columbia, SC (US)

( * ) Notice: Subject to any disclaimer, the term of this patent is extended or adjusted under 35 U.S.C. 154(b) by 490 days.

(21) Appl. No.: 14/488,888

(22) Filed: Sep. 17, 2014

(65) Prior Publication Data

US 2015/0079361 A1   Mar. 19, 2015

Related U.S. Application Data

(60) Provisional application No. 61/878,844, filed on Sep. 17, 2013.

(51) Int. Cl.
| | |
|---|---|
| *G11B 5/31* | (2006.01) |
| *B82Y 30/00* | (2011.01) |
| *G11B 5/012* | (2006.01) |
| *G11B 5/68* | (2006.01) |
| *G11B 5/74* | (2006.01) |
| *H01F 1/00* | (2006.01) |
| *B82Y 40/00* | (2011.01) |

(52) U.S. Cl.
CPC .............. *B82Y 30/00* (2013.01); *G11B 5/012* (2013.01); *G11B 5/68* (2013.01); *G11B 5/743* (2013.01); *H01F 1/0054* (2013.01); *B82Y 40/00* (2013.01); *Y10T 428/24876* (2015.01)

(58) Field of Classification Search
CPC ............ B82Y 30/00; G11B 5/012; G11B 5/68
See application file for complete search history.

(56) References Cited

U.S. PATENT DOCUMENTS

| | | | |
|---|---|---|---|
| 3,826,667 A | 7/1974 | Cohen | |
| 3,855,526 A | 12/1974 | Molina | |
| 4,529,621 A | 7/1985 | Ballard | |
| 4,935,147 A | 6/1990 | Ullman et al. | |
| 4,978,938 A | 12/1990 | Partin et al. | |
| 5,325,566 A | 7/1994 | Jahani | |
| 5,445,008 A | 8/1995 | Wachter et al. | |
| 5,676,877 A | 10/1997 | Borduz et al. | |
| 5,769,996 A | 6/1998 | McArdle et al. | |
| 5,792,510 A | 8/1998 | Farrow et al. | |

(Continued)

FOREIGN PATENT DOCUMENTS

WO   WO2008/118191   11/2008

OTHER PUBLICATIONS

Gokemeijer, et al., Recording head metrology at sub-100 nm device dimensions. Journal of *Applied Physics*, 2005. 97: p. 083912.

(Continued)

*Primary Examiner* — Dah-Wei D Yuan
*Assistant Examiner* — Kristen A Dagenais
(74) *Attorney, Agent, or Firm* — Dority & Manning, PA (57) ABSTRACT

Methods for forming a multi-layered nanoscale structure by forming a stack of individual polymeric layers on a substrate are provided. Each individual polymeric layer comprises a cured polymeric material immobilizing a pattern of magnetic nanoparticles. The pattern of magnetic nanoparticles can be different within each individual polymeric layer due to their nature of formation.

18 Claims, 6 Drawing Sheets

(56) References Cited

U.S. PATENT DOCUMENTS

| | | | |
|---|---|---|---|
| 6,262,306 | B1 | 7/2001 | Leriche et al. |
| 6,821,596 | B2 | 11/2004 | Terao et al. |
| 7,031,186 | B2 | 4/2006 | Kange et al. |
| 8,617,643 | B2 | 12/2013 | Crawford |
| 2002/0081714 | A1* | 6/2002 | Jain ............... B03C 1/035 435/287.2 |
| 2004/0257894 | A1 | 12/2004 | Onogi et al. |
| 2005/0145909 | A1 | 7/2005 | Giebeler et al. |
| 2005/0147977 | A1 | 7/2005 | Koo et al. |
| 2005/0238967 | A1 | 10/2005 | Rogers et al. |
| 2005/0239948 | A1 | 10/2005 | Haik et al. |
| 2005/0249667 | A1 | 11/2005 | Tuszynski et al. |
| 2006/0003152 | A1 | 1/2006 | Youngs |
| 2007/0202403 | A1 | 8/2007 | Oh et al. |
| 2007/0237987 | A1 | 10/2007 | Winarski |
| 2008/0176109 | A1 | 7/2008 | Kim et al. |
| 2010/0259259 | A1* | 10/2010 | Zahn ............... G01R 33/5601 324/309 |
| 2010/0279024 | A1* | 11/2010 | Crawford ............... B82Y 25/00 427/508 |
| 2011/0221431 | A1* | 9/2011 | Kwon ............... G01R 33/1276 324/246 |
| 2012/0094017 | A1* | 4/2012 | Crawford ............... B82Y 30/00 427/130 |

OTHER PUBLICATIONS

Gokemeijer, et al., Direct measurement of the field from a magnetic recording head using an InAs hall sensor on a contact write/read tester. Journal of Magnetism and Magnetic Materials, 2005. 290-291: p. 254.

Gokemeijer, et al., Write field measurements of a perpendicular head on a soft underlayer film. IEEE Transactions on Magnetics, 2006. 42: p. 163.

Leonhardt, et al., Comparison of perpendicular and longitudinal magnetic recording using a contact write/read tester. IEEE Trans. Magn., 2001. 37(4): p. 1580.

Lohau, et al., Dynamic coercivity measurements of antiferromagnetically coupled magnetic media layers. Appl. Phys. Lett., 2001. 78(18): p. 2748.

Moser, et al., Dynamic coercivity measurements in thin film recording media using a contact write/read tester. J. Appl. Phys., 1999. 85(8): p. 5018.

Schrag, et al., Submicron electrical current density imaging of embedded microstructures. Appl. Phys. Lett., 2003. 82(19): p. 3272.

Yamamoto et al., Scanning magnetoresistance microscopy (SMRM): Imaging with a MR head. J. Appl. Phys., 1997. 81(8): p. 4696.

Shi et al., "A General Approach to Binary and Ternary Hybrid Nanocrystals" Nano Letters 2006, vol. 6, No. 4, 875-881.

Zhu et al., "Well-Aligned Open-Ended Carbon Nanotube Architectures: An Approach for Device Assembly" vol. 6, No. 2, 243-247.

Terris et al., "Nanofabricated and Self-Assembled Magnetic Structures as Data Storage Media" J. Phys. D: Appl. Phys. 38 (2005) R199-R222.

International Search Report for PCT/US07/80080, dated Sep. 22, 2008; (3 pgs.).

* cited by examiner

Flush cell and add curable polymer

*Fig. 1c*

Push out extra polymer to desired layer thickness

*Fig. 1d*

Cure polymer

Repeat:
Flow nanoparticles

*Fig. 2a*

Nanoparticles assemble on the medium

*Fig. 2b*

Flush cell and add curable polymer

*Fig. 3*

3-DIMENSIONAL PATTERN TRANSFER NANOMANUFACTURING

PRIORITY INFORMATION

The present application claims priority to U.S. Provisional Patent Application Ser. No. 61/878,844 titled "3-Dimensional Pattern Transfer Nanomanufacturing" of Thomas Crawford filed on Sep. 17, 2013, the disclosure of which is incorporated by reference herein.

GOVERNMENT SUPPORT CLAUSE

This invention was made with government support under contract no. 1130636 awarded by the National Science Foundation. The government has certain rights in the invention.

BACKGROUND

One of the key challenges to successful nanomanufacturing is the discovery of a means to assemble nanoscale objects into controlled, user-defined patterns for lower cost and capital investment than current microelectronic assembly technologies. While self-assembly techniques can make largely (although not perfect) regular arrays of nanostructures, programming the local nanoscale assembly process in a reliable and cost effective manner, and then putting these locally-assembled pieces into a bigger macroscale structure has yet to be realized as a potential manufacturing technology. Alternative lithography techniques have obtained nanoscale resolution, but still employ top-down or subtractive processing. There have been efforts to trap small particles with magnetic fields. However, to date, these solutions have employed patterned magnetic materials which are in set configurations, i.e. they are not locally reprogrammable into arbitrary patterns.

As such, a need currently exists for a programmable local nanoscale assembly process which can be further assembled into a larger macroscale structure.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 1a through FIG. 1g sequentially show an exemplary method for forming an individual polymeric layer having a pattern of magnetic nanoparticles positioned therein, with:

FIG. 2a through FIG. 2f sequentially show an exemplary method of forming an additional polymeric layer having a pattern of magnetic nanoparticles positioned therein onto the layer formed according to FIGS. 1a-1g, with:

It is noted that the particular materials and dimensions shown in the Figures are intended to be representative only such that the Figures encompass the full scope of the claimed and described inventions.

SUMMARY

Objects and advantages of the invention will be set forth in part in the following description, or may be obvious from the description, or may be learned through practice of the invention.

Methods are generally provided for forming a multi-layered nanoscale structure by forming a stack of individual polymeric layers on a substrate, with each individual polymeric layer comprising a cured polymeric material immobilizing a pattern of magnetic nanoparticles. In one embodiment, each individual polymeric layer is formed by: (a) flowing a colloidal suspension over the substrate and under a recording head, wherein the colloidal suspension comprises a plurality of magnetic nanoparticles suspended in a fluid, (b) immobilizing a pattern of the magnetic nanoparticles over the substrate using the recording head, (c) flushing the colloidal suspension from between the substrate and the recording head to leave the pattern of magnetic nanoparticles immobilized over the substrate, (d) introducing a curable polymeric material between the substrate and the recording head, (e) moving the recording head closer to the substrate, (f) polymerizing the curable polymeric material to form the individual polymeric layer securing the pattern of magnetic nanoparticles immobilized over the substrate, and (g) moving the recording head away from the substrate to leave the individual polymeric layer over the substrate.

Other features and aspects of the present invention are discussed in greater detail below.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods are generally provided for 3-dimensional (3D) printing that uses Pattern Transfer Nanomanufacturing to perform layer-by-layer printing of multiple layer nanocomposites. Within each layer, the composite is formed by magnetic-field directed assembly of magnetic nanoparticles within a UV-curable polymer. After curing, the layer is released from the template substrate, and a new layer is subsequently built thereon. These layers can have user-designed features within a layer, controlled, and variable layer spacings, and user-specified number of layers. As such, the pattern formed is completely user-controlled, and can be varied from layer to layer. Additionally each layer can have a controlled thickness, which can be varied from layer to layer. Finally, the composite can have a controlled numbers of layers present. Thus, the template can be different for each layer, or it can be repeated with user-controlled frequency.

Figure 3:
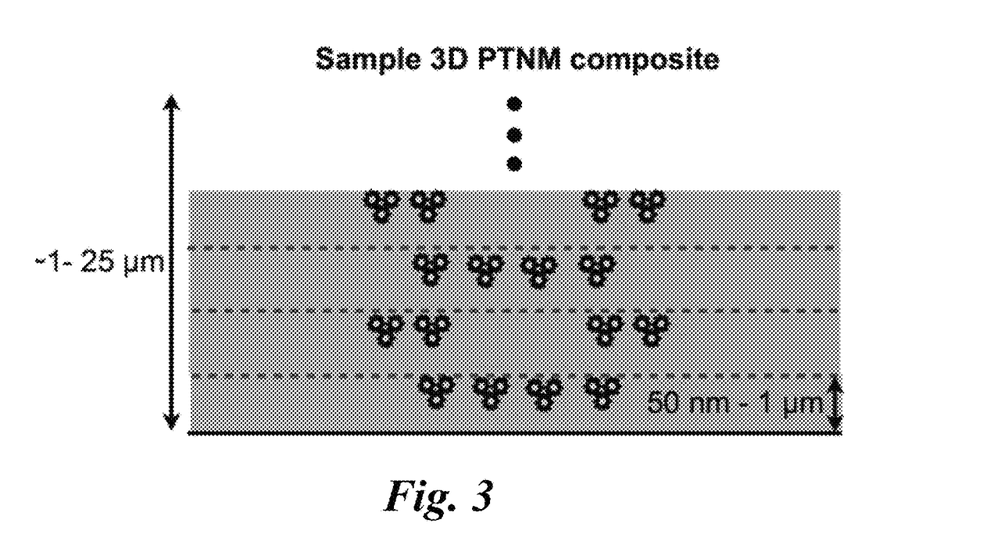
FIG. 3 shows an exemplary 3D PTNM composite formed by performing the method shown in FIGS. 1a-1g, and then repeating the method shown in FIGS. 2a-2f to form multiple layers on the substrate.

Referring to FIGS. 1-3, a general schematic of one exemplary method is shown for Pattern Transfer Nanomanufacturing to perform layer-by-layer printing of multiple layer nanocomposites. Generally, FIGS. 1*a*-1*g* sequentially show an exemplary method for forming an individual polymeric layer having a pattern of magnetic nanoparticles positioned therein; FIGS. 2*a*-2*f* sequentially show an exemplary method of forming an additional polymeric layer having a pattern of magnetic nanoparticles positioned therein onto the layer formed according to FIGS. 1*a*-1*g*; and FIG. 3 shows an exemplary 3D PTNM composite formed by performing the method shown in FIGS. 1*a*-1*g* and then repeating the method shown in FIGS. 2*a*-2*f*. Each of these steps are discussed in greater detail below.

When utilized to assemble 3D macroscale objects, this technology can be employed for nanomanufacturing. Because it can use commercial magnetic recording technology, nanoscale resolution is obtained for very low cost. Moreover, because the assembly platform is reusable, the overall cost management structure should be economically viable for nanomanufacturing with significantly lower total capital investment than for conventional microelectronic fabrication techniques.

1. Forming an Individual Polymer Layer

As stated, FIGS. 1*a*-1*g* sequentially show an exemplary method for forming an individual polymeric layer having a pattern of magnetic nanoparticles positioned therein.

Figure 1A:
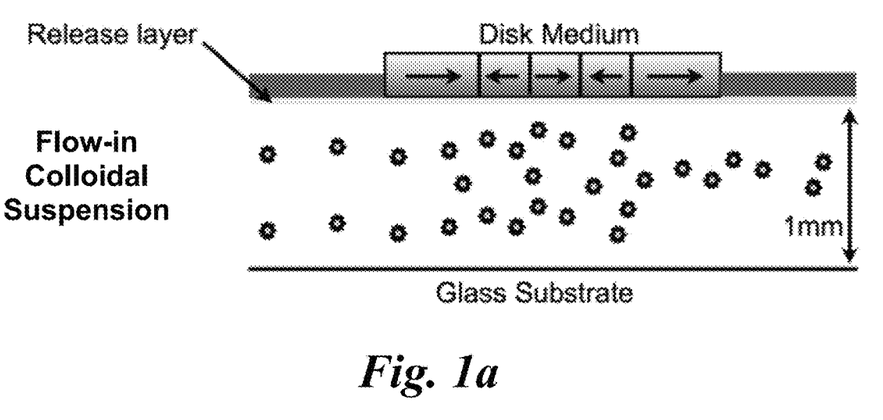
FIG. 1a showing a colloidal suspension flowing in the area between a glass substrate and a disk medium (this area being referred to as a cell), FIG. 1b showing the nanoparticles assembled on the disk medium according to the programing of the disk medium, FIG. 1c showing the cell being flushed from any remaining colloidal suspension and/or loose nanoparticles and a curable polymer being added, FIG. 1d showing the cell being compressed to the desired thickness, FIG. 1e showing the cell being cured such that the curable polymer immobilizes the assembled nanoparticles over the glass substrate to form a first layer, FIG. 1f showing the disk medium being retracted after curing to expose the first layer on the glass substrate, and FIG. 1g showing the disk medium being interchanged or repositioned to define a second pattern.

In one embodiment, each individual polymeric layer is formed by first flowing a colloidal suspension over the substrate and under a recording head/disk medium, as shown in FIG. 1*a*. The inner surface of the substrate (i.e., facing the recording head) is spaced apart from the inner surface of the recording head (i.e., facing the substrate) at a distance sufficient to allow flow of the colloidal suspension therebetween. For example, the distance can be about 0.5 mm to about 5 mm, such as about 0.75 mm to about 2 mm.

Although shown as a glass substrate in FIG. 1*a*, any suitable substrate can be utilized (e.g., quartz, fused silica, sapphire, indium tin oxide, or other transparent UV-transmissive material).

Generally, the colloidal suspension comprises a plurality of magnetic nanoparticles suspended in a fluid (e.g., water, water containing a salt, acid, or base to control pH, or oil). The magnetic nanoparticles can be any suitable magnetic particle having an average diameter on the nanoscale. In one embodiment, the magnetic nanoparticles can be iron-containing particles (i.e., comprising iron), such as magnetite, hematite, another iron-containing compound, or mixtures thereof. Alternatively, the magnetic nanoparticles can be superparamagnetically coated nanoparticles, such as magnetically coated gold nanoparticles. Superparamagnetic magnetic coatings for nanoparticles are generally known in the art and include iron oxide coatings ($Fe_3O_4$). However, any superparamagnetic magnetic coating can be utilized with the present disclosure. Likewise, any suitable nanoparticle can be used in conjunction with the present disclosure. Particularly suitable nanoparticles include gold and silver nanoparticles. Other suitable nanoparticles include nanowires (e.g., semiconductor nanowires) and nanorods (e.g., carbon nanotubes). In particular embodiments, the magnetic nanoparticles can have an average size of about 100 nanometers or less (e.g., about 5 nanometers to about 25 nanometers).

Figure 1B:
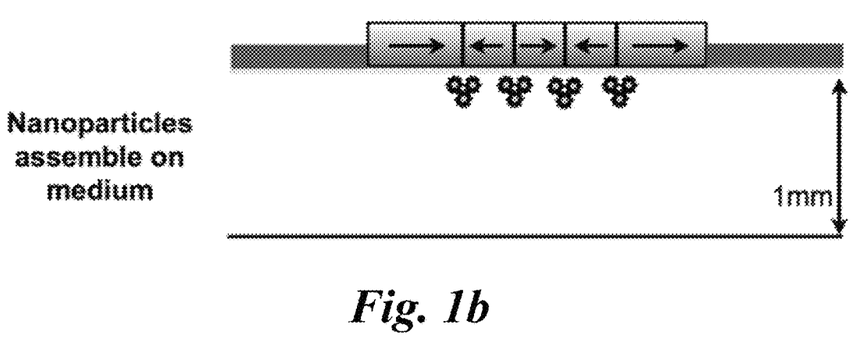
Figure 1C:
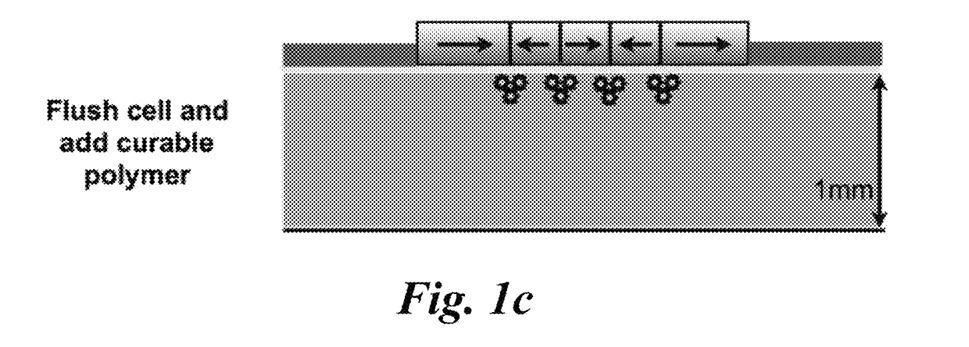

Using the recording head (shown as a "disk medium" in FIG. 1*a*), a pattern of the magnetic nanoparticles is formed over the substrate, as shown in FIG. 1*b*. In particular, a nano-sized electromagnet, known as the write head or writer, in the recording head is energized via an electric current such that the poles of the electromagnet emit a strong magnetic field. This field aligns the alloy grains (e.g., Co) in the direction of the applied field. When the current is reversed, the grains are aligned in the opposite direction. The region on the medium where the oppositely directed grains meet, known as a transition, emits a stray magnetic field, with its orientation (up or down) depending on whether the north or south poles of the grains meet in this region. This stray magnetic field emanates from a spatial region of the media which is on the order of the grain size, e.g., less than about 10 nm for present magnetic recording technology. Mathematically, the field is given by the following expression, $$H_y = \frac{M_r}{2\pi} \ln\left(\frac{\left(a+y-\frac{\delta}{2}\right)^2 + x^2}{\left(a+y+\frac{\delta}{2}\right)^2 + x^2}\right),$$

where $M_r$ is the remanent magnetization, a is the transition parameter, y is the height above the media, and x is the distance away from the transition laterally.

In general, magnetically-recorded patterns of this type will alternate in field direction. However, a negative field will induce a moment in a superparamagnetic nanoparticle such that it will be attracted to the region of strongest negative field similar to an adjacent transition of strong positive field. In other words, the magnetic moment of the nanostructure may take either direction and will still be attracted, i.e. the force is "uniaxial." For reasonable transition separations, the induced moment would be such that it would be repelled from adjacent transitions of oppositely directed fields, enhancing the ability of a local transition to magnetize and trap nanoparticles. In addition to in-plane magnetized magnetic media, it is also possible to have magnetic media with a magnetization perpendicular to the plane. Such a media would offer the ability to change the size of the spatial region in which the nanoparticle is trapped, and having both types of media could offer an advantage in terms of flexibility of nanoparticle assembly.

A specific device is disclosed and described herein for the trap structure, which must satisfy several critical design requirements. To magnetically record the magnetic media, the write head must be within a certain distance of the media, typically less than about 25 nm and in advanced devices, less than about 10 nm. This has been demonstrated using recording heads in contact with media surfaces by correctly measuring the parameters expected for the component part performance. However, in order to have sufficiently large and spatially-localized trapping fields, the nanoparticles must be similarly close to the media.

Figure 1D:
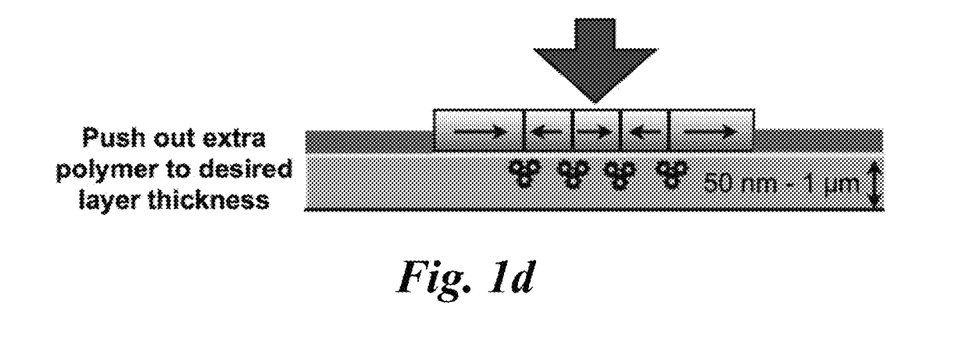
Figure 1E:
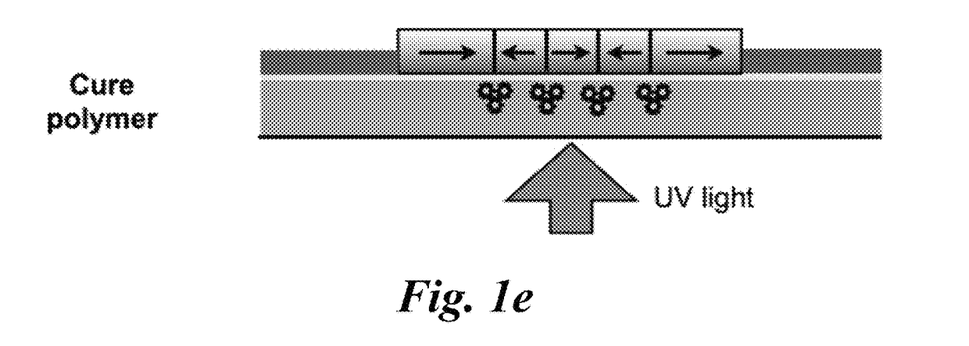
Figure 1F:
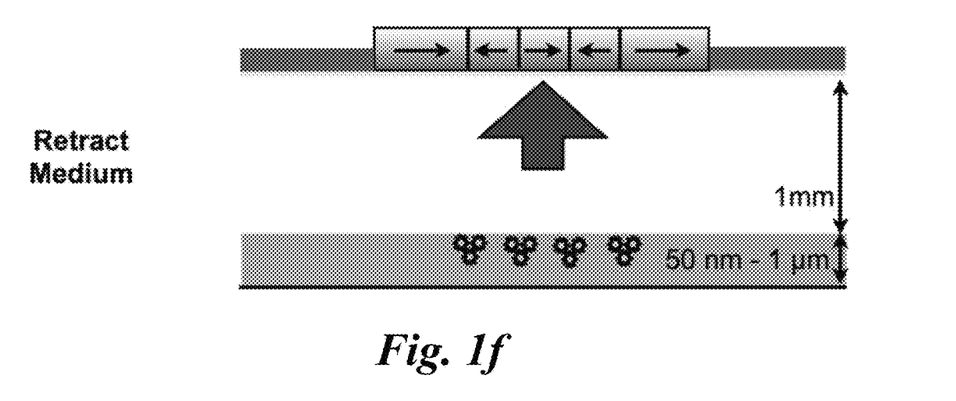

In one embodiment, the recording head is a head-gimbal assembly (HGA) with a z-stage that allows for vertical movement of the recording head (e.g., see FIGS. 1d and 1f). The XY piezo stage provides nanometer accuracy positioning of the transducer within a single window to encode the transitions which will trap the nanostructures. More specifically, the recording head can include a slider movably placed on a suspension. The slider is connected to an aluminum oxide ($Al_2O_3$) spacer and a transducer. The entire assembly tool can be computer-controlled. That is, a computer can control the movement of the recording head on the suspension through a connection (e.g., wireless or cabled). Thus, the movement of the recording head can be controlled via a computer program. The computer program can be written to position the recording head in any area, such that a nearly infinite number of patterns of magnetic field profiles can be applied and formed by the magnetic nanoparticles over the substrate.

After the nanoparticles are assembled by the recording head, the colloidal suspension is flushed from between the substrate and the recording head to leave the pattern of magnetic nanoparticles immobilized over the substrate, and a curable polymeric material is introduced between the substrate and the recording head, as shown in FIG. 1d.

In one embodiment, the colloidal suspension is flushed with the same fluid of the colloidal suspension. Alternatively, the colloidal suspension can be flushed with pure water, or with an acid, base, or salt solution to modify solution pH or ionic concentration. It could also be flushed with a non-polar organic solvent. Generally, flushing of the colloidal suspension leaves only those immobilized magnetic nanoparticles (by the recording head) between the substrate and the recording head.

The curable polymeric material is curable to form a gel-like solid structure after curing. The curable polymeric material can include monomers and/or polymers prior to curing. Thus, when in a liquid stage for flowing between the substrate and the recording head, the polymeric solution remains in liquid form. In one embodiment, a photoinitiator can be also included in the polymeric solution in order to initiate curing upon the application of ultraviolet light (e.g., light having a wavelength between about 400 nm and about 10 nm). Likewise, a solvent may be present in the polymeric solution in order to keep the polymeric solution in liquid form during the initial stages.

For example, commercial photoresist formulations can be used as the curable polymer. In addition, polyethylene glycol (PEG) dimethacrylate polymers can be cross linked via a free radical reaction initiated with potassium persulfate by heating the polymer matrix above 70° C. It could alternatively be cross-linked via photo-initiated polymerization using water soluble initiatiors. (See e.g., R Liska. Photoinitiators with functional groups. v. new water-soluble photoinitiators containing carbohydrate residues and copolymerizable derivatives thereof. Journal of Polymer Science, Part A: Polymer Chemistry, 40(10):1504-1518, May 2002.)

The recording head is then moved closer to the substrate (i.e., down) such that extra curable polymeric material is pushed out of the system, as shown in FIG. 1d. The spacing between the inner surface of the substrate and the inner surface of the recording media after this movement will substantially translate to the thickness of the resulting polymeric layer after curing. Then, the curable polymeric material is polymerized (i.e., cured) to form the individual polymeric layer securing the pattern of magnetic nanoparticles immobilized over the substrate. The embodiment shown in FIG. 1e utilizes UV-curing to polymerize the curable polymeric material. However, any suitable curing method can be utilized (e.g., heat). If utilizing light (e.g., UV light) to cure the polymeric material, then the substrate must be substantially transparent to those wavelengths.

After curing, the recording head is moved away from the substrate, as shown in FIG. 1f. The cured polymeric material generally holds and immobilizes the magnetic nanoparticles in the individual layer formed. A release layer can be, in one embodiment, present on the surface of the recording head facing the substrate to facilitate the separation of the recording head from the cured polymeric material. The release layer can be made of a self-assembled organosilane monolayer (SAM), or other thiol or organic based self-assembled monolayer that is compatible with the process chemistry.

Figure 1G:
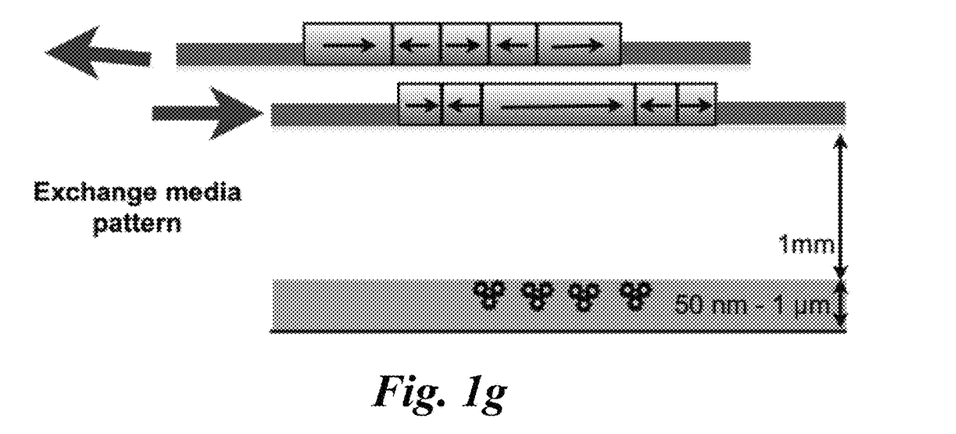
Figure 2A:
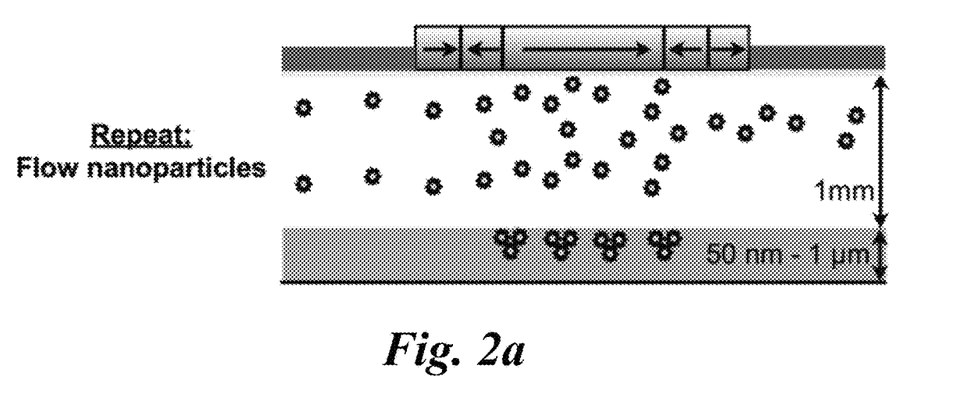
FIG. 2a showing a colloidal suspension flowing in the area between the first layer formed according to FIGS. 1a-1g and a disk medium (this area being referred to as a cell), FIG. 2b showing the nanoparticles assembled on the disk medium according to the programing of the disk medium, FIG. 2c showing the cell being flushed from any remaining colloidal suspension and/or loose nanoparticles and a curable polymer being added, FIG. 2d showing the cell being compressed to the desired thickness, FIG. 2e showing the cell being cured such that the curable polymer immobilizes the assembled nanoparticles over the first layer to form a second layer, and FIG. 2f showing the disk medium being retracted after curing to expose the second layer.
Figure 2B:
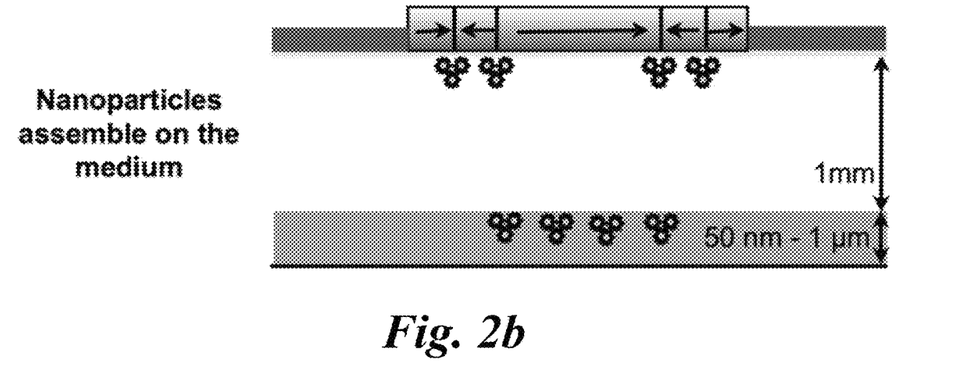
Figure 2C:
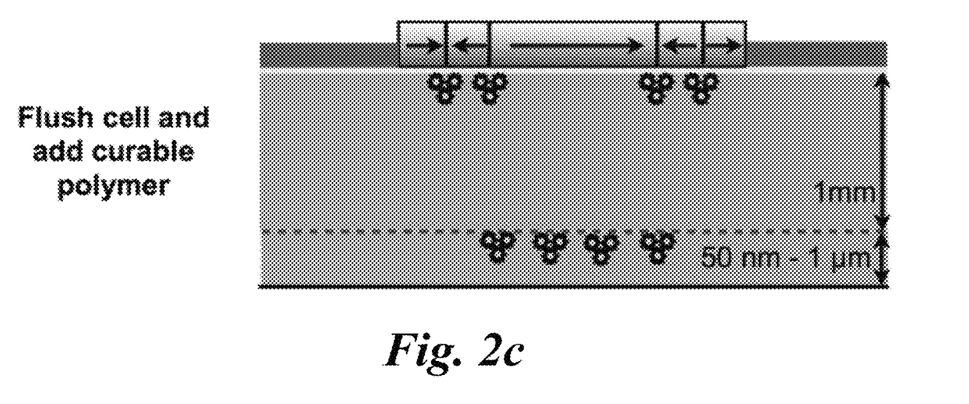
Figure 2D:
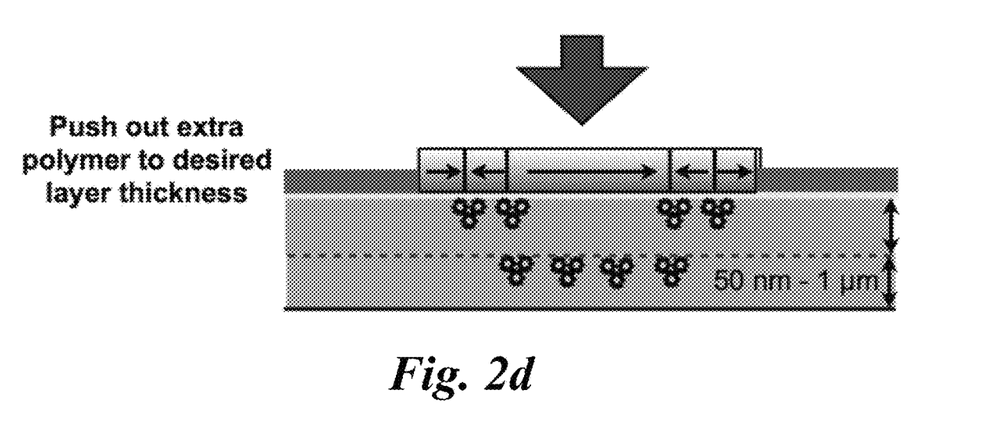
Figure 2E:
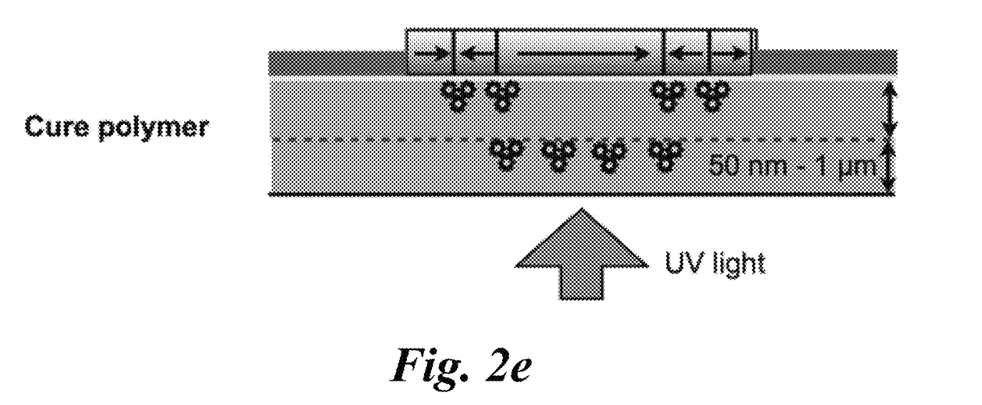
Figure 2F:
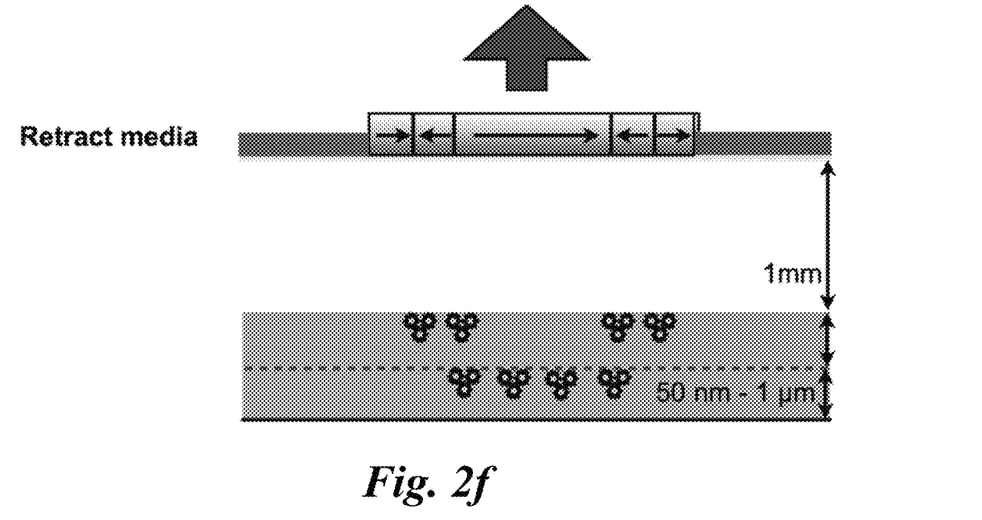

According to this method, a first polymeric layer is left on the substrate with the cured polymeric material holding the magnetic nanoparticles immobilized in therein. As such, a new recording head pattern can be formed above the substrate without effecting the layer already formed and cured, such as shown in FIG. 1g.

In one embodiment, the method of assembly of each layer can include a feature or features of the methods disclosed in U.S. Publication No. 2010/0279024 of Crawford and/or U.S. Publication No. 20120094017 of Crawford, et al.; the disclosures of both are incorporated by reference herein.

2. Forming Additional Layers

As stated, FIGS. 2a-2f sequentially show an exemplary method of forming an additional polymeric layer having a pattern of magnetic nanoparticles positioned therein onto the layer formed according to FIGS. 1a-1g. Essentially, the steps shown in FIGS. 1a-1f are repeated with the steps shown in FIGS. 2a-2f. As such, the description above with respect to FIG. 1a is repeated for FIG. 2a, with respect to FIG. 1b is repeated for FIG. 2b, and so forth. However, the components and materials of discussed above with respect to the first individual layer can be independently selected in forming the second individual layer, the third individual layer, and so forth. Additionally, each individual layer can be formed to a thickness that can be independently selected from the other layers. In certain embodiments, each individual polymeric layer formed over the substrate can have a thickness of about 50 nm to about 1 μm.

3. Multi-layered Composite

The steps shown in FIGS. 2a-2f can be utilized to form additional layers on the first individual polymeric layer to form a stack of individual layers. Through these methods, the pattern of magnetic nanoparticles in each individual polymeric layer can be independent from each other. The stack of individual layers can have a total thickness on the substrate of about 1 μm to about 25 μm, in particular embodiments.

FIG. 3 shows an exemplary 3D PTNM composite formed by performing the method shown in FIGS. 1a-1g and then repeating the method shown in FIGS. 2a-2f. Although shown having four individual layers, any suitable number of individual layers can be formed. For example, the stack can include about 10 to about 100 individual layers in particular embodiments.

EXAMPLES

The steps of the methods sequentially shown in FIGS. 1a-1g, 2a-2f, and 3 were utilized to form an exemplary substrate. The media was inverted and held over a UV fused silica or other transparent substrate at a precision separation controlled by a piezo flexure stage. A release layer is deposited on the media to facilitate the standard PTNM polymer transfer process. With a 1 mm separation, colloidal magnetic nanoparticles are pumped into a fluid cell formed by the inverted media and the substrate (Step 1). The particles then assemble on the medium via PTNM (Step 2). The colloid is flushed from the system and replaced with a photo or heat curable polymer (Step 3). The media is then moved by the piezo stage closer to the substrate to achieve a desired spacing, e.g. between 100-1000 nm for optically-active composites. (Step 4). Light (UV, halogen, for either optical or thermal cross-linking) then cures the polymer from below (as in negative resist photolithography) (Step 5). The piezo stage then retracts the inverted medium, yielding a 2D PTNM assembled layer embedded in a transparent polymer. The media is translated laterally either to be re-recorded with a recording head, or exchanged for another recorded medium (Step 7), and the process is repeated, yielding two arbitrarily patterned nanoparticle layers stacked at a controlled separation These and other modifications and variations to the present invention may be practiced by those of ordinary skill in the art, without departing from the spirit and scope of the present invention, which is more particularly set forth in the appended claims. In addition, it should be understood that the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of forming a multi-layered nanoscale structure, the method comprising:
   forming a stack of individual polymeric layers on a substrate, each individual polymeric layer comprising a cured polymeric material immobilizing a pattern of magnetic nanoparticles, wherein each individual polymeric layer is formed on one another by repeating, for each individual polymeric layer, a process of:
   flowing a colloidal suspension over the substrate and under a recording head, wherein the colloidal suspension comprises a plurality of magnetic nanoparticles suspended in a fluid;
   immobilizing a pattern of the magnetic nanoparticles over the substrate using the recording head;
   flushing the colloidal suspension from between the substrate and the recording head to leave the pattern of magnetic nanoparticles immobilized over the substrate;
   introducing a curable polymeric material between the substrate and the recording head;
   moving the recording head closer to the substrate;
   polymerizing the curable polymeric material to form the individual polymeric layer securing the pattern of magnetic nanoparticles immobilized over the substrate; and
   moving the recording head away from the substrate to leave the individual polymeric layer over the substrate, wherein the pattern of magnetic nanoparticles in each individual polymeric layer is different from each other.

2. The method of claim 1, wherein the pattern of magnetic nanoparticles in each individual polymeric layer is independent from each other.

3. The method of claim 1, wherein the magnetic nanoparticles of at least one individual layer comprise iron-containing particles.

4. The method of claim 1, wherein the magnetic nanoparticles of at least one individual layer comprise superparamagnetically coated nanoparticles.

5. The method of claim 1, wherein the curable polymeric material of at least one individual layer comprises a polyethylene glycol (PEG) dimethacrylate based polymer.

6. The method of claim 1, wherein the fluid of the colloidal suspension comprises water or water with acid, base, or salt added to modify solution pH and/or ionic strength in the solution.

7. The method of claim 1, wherein each layer has a thickness of about 50 nm to about 1 μm.

8. The method of claim 1, wherein the stack of individual polymeric layers has a thickness of about 1 μm to about 25 μm.

9. The method of claim 1, wherein the substrate comprises glass.

10. The method of claim 1, wherein the substrate is substantially transparent to light having a wavelength between about 400 nm and about 10 nm.

11. The method of claim 10, wherein the curable polymeric material is cured by UV light emitted through the substrate.

12. The method of claim 1, wherein a release layer is positioned on an inner surface of the recording head to facilitate removal of the recording head from the individual polymeric layer when moving the recording head away from the substrate.

13. The method of claim 1, wherein the stack includes about 10 to about 100 individual polymeric layers.

14. A stack of individual polymeric layers on a substrate formed according to the method of claim 1.

15. A method of forming a multi-layered nanoscale structure, the method comprising:
   flowing a first colloidal suspension over a substrate and under a recording head, wherein the first colloidal suspension comprises a plurality of first magnetic nanoparticles suspended in a first fluid;
   immobilizing a first pattern of the first magnetic nanoparticles over the substrate using the recording head;
   flushing the first colloidal suspension from between the substrate and the recording head to leave the first pattern of first magnetic nanoparticles immobilized over the substrate;
   introducing a first curable polymeric material between the substrate and the recording head;
   moving the recording head closer to the substrate;
   polymerizing the first curable polymeric material to form a first polymeric layer securing the first pattern of first magnetic nanoparticles immobilized over the substrate;
   moving the recording head away from the substrate to leave the first polymeric layer on the substrate;

flowing a second colloidal suspension between the substrate and the recording head, wherein the second colloidal suspension comprises a plurality of second magnetic nanoparticles suspended in a second fluid;

immobilizing a second pattern of the second magnetic nanoparticles over the substrate using the recording head;

flushing the second colloidal suspension from between the substrate and the recording head to leave the second pattern of first magnetic nanoparticles immobilized over the substrate;

introducing a second curable polymeric material between the substrate and the recording head;

moving the recording head closer to the substrate;

polymerizing the second curable polymeric material to form a second polymeric layer securing the second pattern of second magnetic nanoparticles immobilized over the substrate, wherein the first polymeric layer is positioned between the second polymeric layer and the substrate; and moving the recording head away from the substrate to leave the second polymeric layer on the first polymeric layer.

16. The method of claim 15, further comprising:

flowing a third colloidal suspension between the substrate and the recording head, wherein the third colloidal suspension comprises a plurality of third magnetic nanoparticles suspended in a third fluid;

immobilizing a third pattern of the third magnetic nanoparticles over the substrate using the recording head;

flushing the third colloidal suspension from between the substrate and the recording head to leave the third pattern of third magnetic nanoparticles immobilized over the substrate;

introducing a third curable polymeric material between the substrate and the recording head;

moving the recording head closer to the substrate;

polymerizing the third curable polymeric material to form a third polymeric layer securing the third pattern of third magnetic nanoparticles immobilized over the substrate, wherein the second polymeric layer is positioned between the third polymeric layer and the first polymeric layer; and moving the recording head away from the substrate to leave the third polymeric layer on the second polymeric layer.

17. The method of claim 16, further comprising:

flowing a fourth colloidal suspension between the substrate and the recording head, wherein the fourth colloidal suspension comprises a plurality of fourth magnetic nanoparticles suspended in a fourth fluid;

immobilizing a fourth pattern of the third magnetic nanoparticles over the substrate using the recording head;

flushing the fourth colloidal suspension from between the substrate and the recording head to leave the fourth pattern of fourth magnetic nanoparticles immobilized over the substrate;

introducing a fourth curable polymeric material between the substrate and the recording head;

moving the recording head closer to the substrate;

polymerizing the fourth curable polymeric material to form a fourth polymeric layer securing the fourth pattern of fourth magnetic nanoparticles immobilized over the substrate, wherein the third polymeric layer is positioned between the fourth polymeric layer and the second polymeric layer; and moving the recording head away from the substrate to leave the fourth polymeric layer on the third polymeric layer.

18. The method of claim 15, wherein a release layer is positioned on an inner surface of the recording head to facilitate removal of the recording head from the individual polymeric layer when moving the recording head away from the substrate.

* * * * *